(12) United States Patent
Siomina et al.

(10) Patent No.: US 9,131,404 B2
(45) Date of Patent: Sep. 8, 2015

(54) METHODS AND APPARATUS FOR MEASUREMENT CONFIGURATION SUPPORT

(75) Inventors: Iana Siomina, Solna (SE); Muhammad Kazmi, Bromma (SE); Walter Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 297 days.

(21) Appl. No.: 13/696,837

(22) PCT Filed: May 10, 2011

(86) PCT No.: PCT/SE2011/050587
§ 371 (c)(1),
(2), (4) Date: Nov. 8, 2012

(87) PCT Pub. No.: WO2011/142715
PCT Pub. Date: Nov. 17, 2011

(65) Prior Publication Data
US 2013/0065612 A1    Mar. 14, 2013

Related U.S. Application Data

(60) Provisional application No. 61/442,998, filed on Feb. 15, 2011, provisional application No. 61/333,007, filed on May 10, 2010.

(51) Int. Cl.
*H04W 24/00* (2009.01)
*H04W 24/10* (2009.01)
*H04W 64/00* (2009.01)

(52) U.S. Cl.
CPC .............. *H04W 24/10* (2013.01); *H04W 64/00* (2013.01)

(58) Field of Classification Search
CPC ................................ H04W 64/00; H04W 4/02
USPC ............................................ 455/456.1, 456.2
See application file for complete search history.

(56) References Cited

U.S. PATENT DOCUMENTS 5,839,071 A    11/1998  Johnson
6,446,028 B1   9/2002   Wang
(Continued)

FOREIGN PATENT DOCUMENTS

EP          2020823 A1   2/2009
WO    2008085952 A1     7/2008
(Continued)

OTHER PUBLICATIONS

Huawei, "Different Timing Advance Impact on Carrier Aggregation", 3GPP TSG RAN WG2 Meeting #67bis, Miyazaki, Japan, Oct. 12, 2009, pp. 1-3, R2-095815, 3GPP.
(Continued)

*Primary Examiner* — Omoniyi Obayanju
(74) *Attorney, Agent, or Firm* — Coats & Bennett, P.L.L.C.

(57) ABSTRACT

The invention provides a method and a network node for controlling configuration of measurements to be performed by a user equipment (150a, 150b) operating in a wireless communication system (101). A configured measurement corresponds to at least one reporting criteria and the user equipment (150a, 150b) is able to support a limited number of parallel reporting criteria. Measurements to be performed by the user equipment in parallel may be requested by different network nodes such as a positioning server (140) and an eNodeB (110a, 110b). By letting a network node, such as the positioning server (140) or the (eNodeB 110a, 110b), obtain information on measurements requested by another network node the network node is able to configure the user equipment with a set of measurements that does not exceed at least one predetermined threshold for parallel reporting criteria.

32 Claims, 6 Drawing Sheets

(56) References Cited

U.S. PATENT DOCUMENTS

| | | | |
|---|---|---|---|
| 8,295,859 B1 | 10/2012 | Yarkan et al. | |
| 2002/0086682 A1* | 7/2002 | Naghian | 455/456 |
| 2003/0092448 A1 | 5/2003 | Forstrom et al. | |
| 2005/0206566 A1 | 9/2005 | Stilp et al. | |
| 2008/0026733 A1* | 1/2008 | Jaatinen | 455/414.2 |
| 2008/0032705 A1 | 2/2008 | Patel | |
| 2008/0132247 A1 | 6/2008 | Anderson | |
| 2009/0054075 A1 | 2/2009 | Boejer et al. | |
| 2009/0131073 A1 | 5/2009 | Carlson | |
| 2009/0181698 A1* | 7/2009 | Farmer et al. | 455/456.3 |
| 2010/0120447 A1 | 5/2010 | Anderson | |
| 2010/0197300 A1 | 8/2010 | Van Der Velde | |
| 2010/0271263 A1 | 10/2010 | Moshfeghi | |
| 2010/0323720 A1 | 12/2010 | Jen | |
| 2010/0331012 A1 | 12/2010 | Zhang | |
| 2011/0098057 A1 | 4/2011 | Edge et al. | |
| 2011/0117926 A1 | 5/2011 | Hwang et al. | |
| 2012/0015667 A1 | 1/2012 | Woo | |
| 2012/0046030 A1 | 2/2012 | Siomina et al. | |
| 2012/0182874 A1 | 7/2012 | Siomina | |
| 2012/0295623 A1 | 11/2012 | Siomina et al. | |
| 2013/0162470 A1 | 6/2013 | Rousu et al. | |
| 2013/0281117 A1 | 10/2013 | Shen et al. | |

FOREIGN PATENT DOCUMENTS

| | | | |
|---|---|---|---|
| WO | 2009065012 A1 | 5/2009 | |
| WO | 2010107356 A1 | 9/2010 | |
| WO | 2010151213 A1 | 12/2010 | |
| WO | 2011016804 A1 | 2/2011 | |
| WO | 2012099515 A1 | 7/2012 | |
| WO | 2012154105 A1 | 11/2012 | |

OTHER PUBLICATIONS

ETSI, "LTE; Evolved Universal Terrestrial Radio Access (E-UTRA); LTE Positioning Protocol (LPP)", ETSI TS 136 355 V. 9.3.0, 3GPP TS 36.355 v. 9.3.0, Release 9, Oct. 1, 2010, p. 41.

Qualcomm Europe, "TS 36.305: Enhanced cell ID", 3GPP TSG-RAN WG2 #66, May 4, 2009, pp. 1-5, R2-093456, San Francisco, CA, US, pp. 1-5, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V. 10.1.0, Technical Specification, Mar. 1, 2011, pp. 1-290, 3GPP, France.

ETSI, "LTE; Evolved Universal Terrestrial Radio Access Network (E-UTRAN); Stage 2 functional U specification of User Equipment (UE) positioning in E-UTRAN (3GPP TS 36.305 version 10.1.0 Release 10)", ETSI TS 136 305 V10.1.0, Apr. 1, 2011, 7,11,16-19,40-42, 3GPP, France.

ETSI, "LTE; Evolved Universal Terrestrial Radio Access (E-UTRA); Radio Resource Control (RRC); Protocol specification (3GPP TS 36.331 version 10.1.0 Release 10)", ETSI TS 136 331 V1 0.1.0, Apr. 1, 2011, pp. 14,160,186-188,210, 3GPP, France.

3rd Generation Partnership Project, "3rd Generation Partnership Project; Technical Specification Group Radio Access Network; Stage 2 functional specification of User Equipment (UE) positioning in UTRAN (Release 9)", Technical Specification, 3GPP TS 25.305 V9.0.0, Dec. 1, 2009, pp. 1-79, 3GPP, France.

3rd Generation Partnership Project. "3rd Generation Partnership Project; Technical Specification Group Radio Access Network; Requirements for support of radio resource management (FDD) (Release 9)." 3GPP TS 25.133 V9.3.0, Mar. 2010, Sophia Antipolis Valbonne, France.

Hermann, S.D. et al. "Enhancing the Accuracy of Position Information through Superposition of Location Server Data." IEEE International Conference on Communications, 2007, Jun. 24-28, 2007, pp. 2030-2037.

3rd Generation Partnership Project. "Measurement Requirements for LTE." 3GPP TSG-RAN WG4 Meeting #41, R4-061245, Riga, Latvia, Nov. 5-10, 2006.

3rd Generation Partnership Project. "Event Triggering and Reporting Criteria Capability Requirements." 3GPP TSG-RAN WG4 Meeting #48, R4-081976, Jeju, Korea, Aug. 18-22, 2008.

3rd Generation Partnership Project. "Real time RRC/RRM measurements for MDT." 3GPP TSG-RAN WG2 #69, R2-101331, San Francisco, USA, Feb. 22-26, 2010.

3rd Generation Partnership Project. "3rd Generation Partnership Project; Technical Specification Group Radio Access Network; Evolved Universal Terrestrial Radio Access (E-UTRA); Physical Channels and Modulation (Release 9)." 3GPP TS 36.211 V9.1.0, Mar. 2010, Sophia Antipolis Valbonne, France.

3rd Generation Partnership Project. "3rd Generation Partnership Project; Technical Specification Group Radio Access Network; Evolved Universal Terrestrial Radio Access (E-UTRA); Radio Resource Control (RRC); Protocol specification (Release 9)." 3GPP TS 36.331, V9.3.0, Jun. 2010, Sophia Antipolis Valbonne, France.

3rd Generation Partnership Project. "Applicability of mobility requirements with inter-frequency RSTD measurements." Change Request, 3GPP TSG-RAN Meeting #55, R4-102039, Montreal, Canada, May 10-14, 2010.

Siomina, I. et al. "Gap Configuration for Gap-Assisted Positioning Measurements Methods and Apparatus." U.S. Appl. No. 61/333,007, filed May 10, 2010.

3rd Generation Partnership Project. "LTE; Evolved Universal Terrestrial Radio Access (E-UTRA); Requirements for support of radio resource management (3GPP TS 36.133 version 10.1.0 Release 10)." ETSI TS 136 133, V10.1.0, Jan. 2011, Sophia Antipolis Cedex, France. (this reference is split up into 2 separate documents).

3rd Generation Partnership Project. "LTE; Evolved Universal Terrestrial Radio Access (E-UTRA); Physical Layer—Measurements (3GPP TS 36.214 version 8.6.0 Release 8)." ETSI TS 136 214, V8.6.0, Apr. 2009, Sophia Antipolis Cedex, France.

3rd Generation Partnership Project. "LTE; Evolved Universal Terrestrial Radio Access (E-UTRA); LTE Positioning Protocol (LPP) (3GPP TS 36.355 version 10.0.0 Release 10)." ETSI TS 136 355, V10.0.0, Jan. 2011, Sophia Antipolis Cedex, France.

3rd Generation Partnership Project. "LTE; Evolved Universal Terrestrial Radio Access (E-UTRA); LTE Positioning Protocol A (LPPa) (3GPP TS 36.455 version 10.0.0 Release 10)." ETSI TS 136 455, V10.0.0, Jan. 2011, Sophia Antipolis Cedex, France.

* cited by examiner

METHODS AND APPARATUS FOR MEASUREMENT CONFIGURATION SUPPORT

TECHNICAL FIELD

This present disclosure relates in general to measurements in wireless communication networks and in particular to supporting configuration of such measurements in wireless network architectures that utilize signal measurements from multiple cells for e.g. positioning, location, and location-based services.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a user equipment (UE) 150a is wirelessly connected to a radio base station (RBS) 110a commonly referred to as an evolved NodeB (eNodeB), as illustrated in FIG. 1a. Each eNodeB 110a, 110b serves one or more areas each referred to as cells 120a, 120b, and are connected to the core network. In LTE, the eNodeBs 110a, 110b are connected to a Mobility Management Entity (MME) (not shown) in the core network. A positioning server 140, also called a location server, in the control plane architecture in FIG. 1a is connected to the MME. The positioning server 140 is a physical or logical entity that manages positioning for a so called target device, i.e. a wireless device that is being positioned. The positioning server is in the control plane architecture also referred to as an Evolved Serving Mobile Location Center (E-SMLC). As illustrated in FIG. 1a, the E-SMLC 140 may be a separate network node, but it may also be a functionality integrated in some other network node. In a user plane architecture, the positioning is a part of a Secure User Plane Location (SUPL) Location Platform (SLP). The positioning server may be connected to radio network nodes via logical links while using one or more physical connections via other network nodes e.g., the MME. A Network Management (NM) or Operations and Maintenance (O&M) node 141 may be provided to perform different network management operations and activities in the network.

Three key network elements in an LTE positioning architecture are a Location Services (LCS) Client, an LCS target and an LCS Server. The LCS Server is a physical or logical entity managing positioning for a LCS target device by collecting measurements and other location information, assisting the terminal in measurements when necessary, and estimating the LCS target location. The LCS Client is a software and/or hardware entity that interacts with the LCS Server for the purpose of obtaining location information for one or more LCS targets, i.e. the entities being positioned. The LCS Clients may reside in the LCS targets themselves. An LCS Client sends a request to the LCS Server to obtain location information, and the LCS Server processes and serves the received requests and sends the positioning result and optionally a velocity estimate to the LCS Client. A positioning request can be originated from a terminal or the network.

Two positioning protocols operating via the radio network exist in LTE, LTE Positioning Protocol (LPP) and LPP Annex (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. In the control plane, LPP uses RRC protocol as a transport.

LPPa is a protocol between eNodeB and LCS Server specified mainly for control-plane positioning procedures, although it still can assist user-plane positioning by querying eNodeBs for information and eNodeB measurements. Secure User Plane (SUPL) protocol is used as a transport for LPP in the user plane. LPP has also a possibility to convey LPP extension messages inside LPP messages, e.g., currently Open Mobile Alliance (OMA) LPP extensions (LPPe) are being specified to allow, e.g., for operator- or manufacturer-specific assistance data or assistance data that cannot be provided with LPP or to support other position reporting formats or new positioning methods. LPPe may also be embedded into messages of other positioning protocol, which is not necessarily LPP.

A high-level architecture, as it is currently standardized in LTE, is illustrated in FIG. 2, where the LCS target is a terminal 200, and the LCS Server is an E-SMLC 201 or an SLP 202. In the figure, the control plane positioning protocols with E-SMLC as the terminating point are shown by arrows 203, 204 and 205, and the user plane positioning protocol is shown by arrows 206 and 207. The SLP 202 may comprise two components, SUPL Positioning Centre (SPC) and SUPL Location Centre (SLC), which may also reside in different nodes. In an example implementation, the SPC has a proprietary interface with the E-SMLC 201, and an Lip interface with SLC, and the SLC part of SLP communicates with a PDN-Gateway (P-GW) (not shown) and an external LCS Client 208.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

UE positioning is a process of determining UE coordinates in space. Once the coordinates are available, they may be mapped to a certain place or location. The mapping function and delivery of the location information on request are parts of a location service which is required for basic emergency services. Services that further exploit a location knowledge or that are based on the location knowledge to offer customers some added value are referred to as location-aware and location-based services. The possibility of identifying a wireless device's geographical location in the network has enabled a large variety of commercial and non-commercial services, e.g., navigation assistance, social networking, location-aware advertising, and emergency calls. Different services may have different positioning accuracy requirements imposed by an application. Furthermore, requirements on the positioning accuracy for basic emergency services defined by regulatory bodies exist in some countries. An example of such a regulatory body is the Federal Communications Commission regulating the area of telecommunications in the United States.

Positioning Methods

To meet Location-Based Services (LBS) demands, the LTE network will deploy a range of complementary positioning methods characterized by different performance in different environments. Depending on where the measurements are conducted and where the final position is calculated, the methods can be UE-based, UE-assisted or network-based, each with own advantages. The following methods are available in the LTE standard for both the control plane and the user plane:

Cell ID (CID),
UE-assisted and network-based E-CID, including network-based angle of arrival (AoA),
UE-based and UE-assisted A-GNSS (including A-GPS),
UE-assisted Observed Time Difference of Arrival (OTDOA).

Several other techniques such as hybrid positioning, fingerprinting positioning and adaptive E-CID (AECID) do not require additional standardization and are therefore also possible with LTE. Furthermore, there may also be UE-based versions of the methods above, e.g., UE-based GNSS, e.g., GPS, or UE-based OTDOA, etc. There may also be some alternative positioning methods such as proximity based location. UTDOA may also be standardized in a later LTE release, since it is currently under discussion in 3GPP. More methods, LTE and non-LTE, are supported with LPPe.

Similar methods, which may have different names, also exist for other radio-access technologies (RATs), such as CDMA, WCDMA or GSM.

In many environments, a wireless device position can be accurately estimated by using positioning methods based on Global Positioning System (GPS). Nowadays, networks also often have a possibility to assist wireless devices in order to improve the device receiver sensitivity and GPS start-up performance, as for example in an Assisted-GPS (A-GPS) positioning method. GPS or A-GPS receivers, however, may not necessarily be available in all wireless devices. Furthermore, GPS is known to often fail in indoor environments and urban canyons. The complementary terrestrial positioning method OTDOA, has therefore been standardized by 3GPP.

OTDOA Positioning

With OTDOA, a wireless device such as a UE measures the timing differences for downlink reference signals received from multiple distinct locations, such as eNodeBs. For each measured neighbor cell, the UE measures Reference Signal Time Difference (RSTD) which is the relative timing difference between a neighbor cell and the reference cell. The UE measures the timing of the received downlink reference signals using assistance data received from the LCS server, and the resulting measurements are used to locate the UE in relation to the neighboring cells. As illustrated in FIG. 3, the UE position estimate is found as the intersection 430 of hyperbolas 440 corresponding to the measured RSTDs. At least three measurements from geographically dispersed RBSs 410a-c with a good geometry are needed to solve for two coordinates of the UE. In order to find the position, precise knowledge of transmitter locations and transmit timing offsets is needed. Position calculations may be conducted, for example by a positioning node such as the E-SMLC or the SLP in LTE, or by the UE. The former approach corresponds to the UE-assisted positioning mode, and the latter corresponds to the UE-based positioning mode.

In UTRAN Frequency Division Duplex (FDD), an SFN-SFN type 2 measurement (SFN stands for System Frame Number) performed by the UE is used for the OTDOA positioning method. This measurement is the relative timing difference between cell j and cell i based on the primary Common Pilot Channel (CPICH) from cell j and cell i. The UE reported SFN-SFN type 2 is used by the network to estimate the UE position.

Positioning Reference Signals

To enable positioning in LTE and facilitate positioning measurements of a proper quality and for a sufficient number of distinct locations, physical signals dedicated for positioning, such as positioning reference signals (PRS), have been introduced, and low-interference positioning subframes have been specified in 3GPP. PRS are transmitted from one antenna port R6 according to a pre-defined pattern, as described in more detail below.

A frequency shift, which is a function of a Physical Cell Identity (PCI), can be applied to the specified PRS patterns to generate orthogonal patterns and model an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g., cell-specific reference signals (CRS) may also be used for positioning measurements.

PRS are transmitted according to a pre-defined pattern and following one of the pre-defined PRS configurations. PRS are transmitted in pre-defined positioning subframes grouped by a number N_prs of consecutive subframes, i.e. one positioning occasion, as illustrated in FIG. 4. Positioning occasions occur periodically with a certain periodicity of N subframes, corresponding to a time interval T_prs between two positioning occasions. The standardized time intervals T_prs are 160, 320, 640, and 1280 ms, and the number of consecutive subframes N_prs are 1, 2, 4, and 6. Each pre-defined PRS configuration comprises at least PRS transmission bandwidth, N_prs and T_prs.

OTDOA Assistance Information

Since for OTDOA positioning PRS signals from multiple distinct locations need to be measured, the UE receiver often will have to deal with PRS that are much weaker than those received from the UE's serving cell. Furthermore, without approximate knowledge of when the measured signals are expected to arrive in time and what is the exact PRS pattern used, the UE would need to do signal search within a large window, which would impact the time and accuracy of the measurements as well as the UE complexity. To facilitate UE measurements, assistance information, also referred to as assistance data, is transmitted to the UE, which includes e.g. reference cell information, a neighbor cell list containing PCIs of neighbor cells, the number of consecutive downlink subframes N-prs, PRS transmission bandwidth, and frequency.

The assistance information is signaled over LPP from the positioning server, e.g., an E-SMLC in the control plane for an LTE system, to the UE.

OTDOA Inter-Frequency Measurements and Measurement Gaps

In LTE OTDOA, the UE measures Reference Signal Time Difference (RSTD) which has been defined in the standard as the relative timing difference between cell j and cell i, defined as $T_{SubframeRxj}-T_{SubframeRxi}$, where: $T_{SubframeRxj}$ is the time when the UE receives the start of one subframe from cell j, $T_{SubframeRxi}$ is the time when the UE receives the corresponding start of one subframe from cell i that is closest in time to the subframe received from cell j. The reference point for the observed subframe time difference shall be the antenna connector of the UE. The measurements are specified for both intra-frequency and inter-frequency and conducted in the RRC_CONNECTED state.

The inter-frequency measurements, including RSTD, are conducted during periodic inter-frequency measurement gaps which are configured in such a way that each gap starts at an SFN and subframe meeting the following condition:

$$SFN \bmod T = FLOOR(gapOffset/10);$$

$$subframe = gapOffset \bmod 10;$$

with T=MGRP/10, where MGRP stands for "measurement gap repetition period" and mod is the modulo function. The E-UTRAN is required according to the standard to provide a single measurement gap pattern with constant gap duration for concurrent monitoring of all frequency layers and Radio Access Technologies (RATs). Two configurations are according to the standard required to be supported by the UE, with MGRP of 40 and 80 milliseconds (ms), both with a measurement gap length of 6 ms. In practice, due to switching time, this leaves less than 6 but at least 5 full subframes for measurements within each such measurement gap.

In LTE, measurement gaps are configured by the network, i.e. the eNodeB, to enable measurements on different LTE frequencies and/or different RATs such as e.g., UTRA, GSM and CDMA2000. A measurement is configured using the Radio Resource Control (RRC) protocol to signal a measurement configuration to the UE. The gap configuration is signaled to the UE as part of the measurement configuration. Only one gap pattern can be configured at a time. The same pattern is used for all types of configured measurements, e.g. inter-frequency neighbor cell measurements, inter-frequency positioning measurements, inter-RAT neighbor cell measurements, inter-RAT positioning measurements, etc.

In multi-carrier LTE, the inter-frequency measurement gaps are so far intended mainly for performing cell identification and mobility measurements, such as Reference Signal Receiver Power (RSRP) and Reference Signal Received Quality (RSRQ). These measurements require a UE to perform measurements over the synchronization signals, i.e., the primary synchronization signals (PSS) and secondary synchronization signals (SSS), and cell-specific reference signals (CRS) to enable inter-frequency handover and enhance system performance. Synchronization signals are transmitted over 62 resource elements in the center of the allocated bandwidth in subframes 0 and 5. The PSS is transmitted in the last OFDM symbol and the SSS is transmitted in the second to last OFDM symbol of the first slot of a subframe. CRS symbols are transmitted every subframe and over the entire bandwidth according to one of the standardized time-frequency patterns. Different cells can use 6 different shifts in frequency, and 504 different signals exist. With two transmit (TX) antennas, the effective reuse for CRS is three.

As can be seen from the above, both synchronization signals and CRS are transmitted relatively often, although PSS and SSS are transmitted less frequently than CRS. This leaves enough freedom when deciding the exact timing of measurement gaps so that a gap can cover enough symbols with the signals of interest, i.e., PSS/SSS and/or CRS. With a 6 ms measurement gap, at most two SSS and two PSS symbols are possible with very precise timing, while capturing one SSS symbol and one PSS symbol is possible almost without any timing restriction on the measurement gaps since the minimum required effective measurement time is 5 ms on average.

In LTE OTDOA, the network, i.e. the eNodeB, can signal a list of cells operating on up to three frequency layers, including the serving cell frequency. The 3GPP RAN4 requirements for RSTD inter-frequency measurements are defined for two frequency layers, including the serving cell frequency. Furthermore, the measurement gaps are to be defined such that they do not overlap with PRS occasions of the serving cell layer, which would otherwise increase the effective measurement time for both the serving and the inter-frequency cell. Since the measurement gaps configured for the UE are used for RSTD measurements and also for mobility measurements, it has been agreed that the pre-defined "Gap Pattern #0", which specifies relatively dense and frequent measurement gaps, can be used only when inter-frequency RSTD measurements are configured. According to the pre-defined Gap Pattern #0 a measurement gap of 6 ms occurs every 40 ms.

E-CID Positioning

The enhanced cell ID (E-CID) positioning method determines the UE location based on UE and/or BS reporting measurements. Examples of UE measurements are UE Rx-Tx time difference measurement, signal strength e.g., RSRP and signal quality e.g., RSRQ. Examples of BS measurements are BS Rx-Tx time difference measurement, angle of arrival etc.

In LTE release 9 the UE Rx-Tx time difference measurement is performed by the UE from the serving cell. It is reported to both the eNodeB and the E-SMLC.

However, in general at least some of the E-CID measurements may be inter-frequency, inter-band or inter-RAT measurements, e.g., RSRP or RSRQ. Examples of inter-RAT E-CID measurements are UTRA CPICH measurements, GSM carrier RSSI, etc.

Event Triggering and Reporting Criteria

The standard specification 3GPP TS 36.133 V9.3.0 (2010-03) Evolved Universal Terrestrial Radio Access (E-UTRA), Requirements for support of radio resource management (Release 9) (March 2010) specifies requirements on UE capabilities for support of event triggering and reporting criteria. The current requirements are primarily defined for the mobility measurements. The requirements comprise:
- a set of reporting criteria categories,
- the number of reporting criteria per category that the UE shall be able to support in parallel, and
- the maximum total number of reporting criteria.

The current set of reporting criteria comprises three measurement categories used for mobility: intra-frequency, inter-frequency and inter-RAT measurements.

For the intra-frequency category, measurements for up to 9 E-UTRAN intra-frequency cells may be configured in parallel. For the inter-frequency category, measurements of up to 7 E-UTRAN inter-frequency cells may be configured in parallel. And for inter-RAT, up to 5 parallel measurements per supported RAT are supported in 3GPP TS 36.133 V9.3.0. The maximum total number of reporting criteria is thus 21 in 3GPP TS 36.133 V9.3.0. This means depending upon the UE capability, e.g., inter-RAT capabilities, the eNodeB can configure the UE to perform up to 21 measurements in parallel. As long as the measurement configuration does not exceed the reporting criteria requirements above, the UE is required to meet the relevant performance requirements, e.g., measurement reporting delay, measurement accuracy of the configured measurements, etc.

As mentioned earlier, the above requirements cover mobility related measurements which are configured by the serving eNodeB. UE requirements in terms of the maximum number of reporting criteria for the mobility measurements are defined. This ensures that the UE is able to perform and report certain number of measurements in parallel, e.g., event triggered RSRP reporting, periodic RSRP reporting, event triggered RSRQ reporting etc. The total number of parallel measurement reporting criteria is 21 including inter-RAT measurements. The requirements were introduced in Release 8 of the 3GPP standards and do not take into account the positioning measurements, such as OTDOA and E-CID, which were introduced in Release 9. The positioning measurements are configured by a positioning server, such as the E-SMLC. Accordingly measurements to be performed by the UE may be configured by different network nodes. Therefore there is a need for coordination with respect to parallel reporting criteria requirements.

SUMMARY

An object of at least some embodiments in this disclosure is to provide methods and devices for controlling UE measurement configuration when a positioning service is used.

The above stated object is achieved by means of methods and devices according to the independent claims.

A first embodiment provides a method in a network node of controlling configuration of measurements to be performed by a user equipment operating in a wireless communication system. A configured measurement corresponds to at least one reporting criteria and the user equipment is able to support a limited number of parallel reporting criteria. The method comprises obtaining information on a plurality of measurements requested by a plurality of different network nodes. The measurements are to be performed by the user equipment in parallel and include at least one positioning measurement. The method comprises a further step of using the obtained information to configure the user equipment with a set of measurements that does not exceed a predetermined threshold for parallel reporting criteria.

A second embodiment provides a network node for controlling configuration of measurements to be performed by a user equipment operating in a wireless communication system. A configured measurement corresponds to at least one reporting criteria and the user equipment is able to support a limited number of parallel reporting criteria. The network node comprises a receiver, a transmitter and a processor (74). The receiver and the processor are adapted to obtain information on a plurality of measurements requested by a plurality of different network nodes. The measurements are to be performed by the user equipment in parallel and include at least one positioning measurement. The processor and the transmitter of the network node are adapted to use the obtained information to configure the user equipment with a set of measurements that does not exceed a predetermined threshold for parallel reporting criteria.

An advantage of some of the embodiments described herein is that it is made possible for a node of the wireless communication system to monitor and control that UE requirements and/or capabilities with respect to parallel reporting criteria are not exceeded in when positioning is used. By providing a network node with information regarding UE measurements requested by different network nodes, which may request positioning measurements as well as non-positioning measurements, the network node is able to control that the UE is configured with measurements that do not exceed one or several predetermined thresholds for parallel reporting criteria. A predetermined threshold may e.g. be a standardized UE requirement regarding a total number of parallel reporting criteria or a UE capability with respect to a specific measurement category, such as the UEs capability of parallel positioning measurements.

Further advantages and features of embodiments of the present invention will become apparent when reading the following detailed description in conjunction with the drawings.

DETAILED DESCRIPTION

Figure 1:
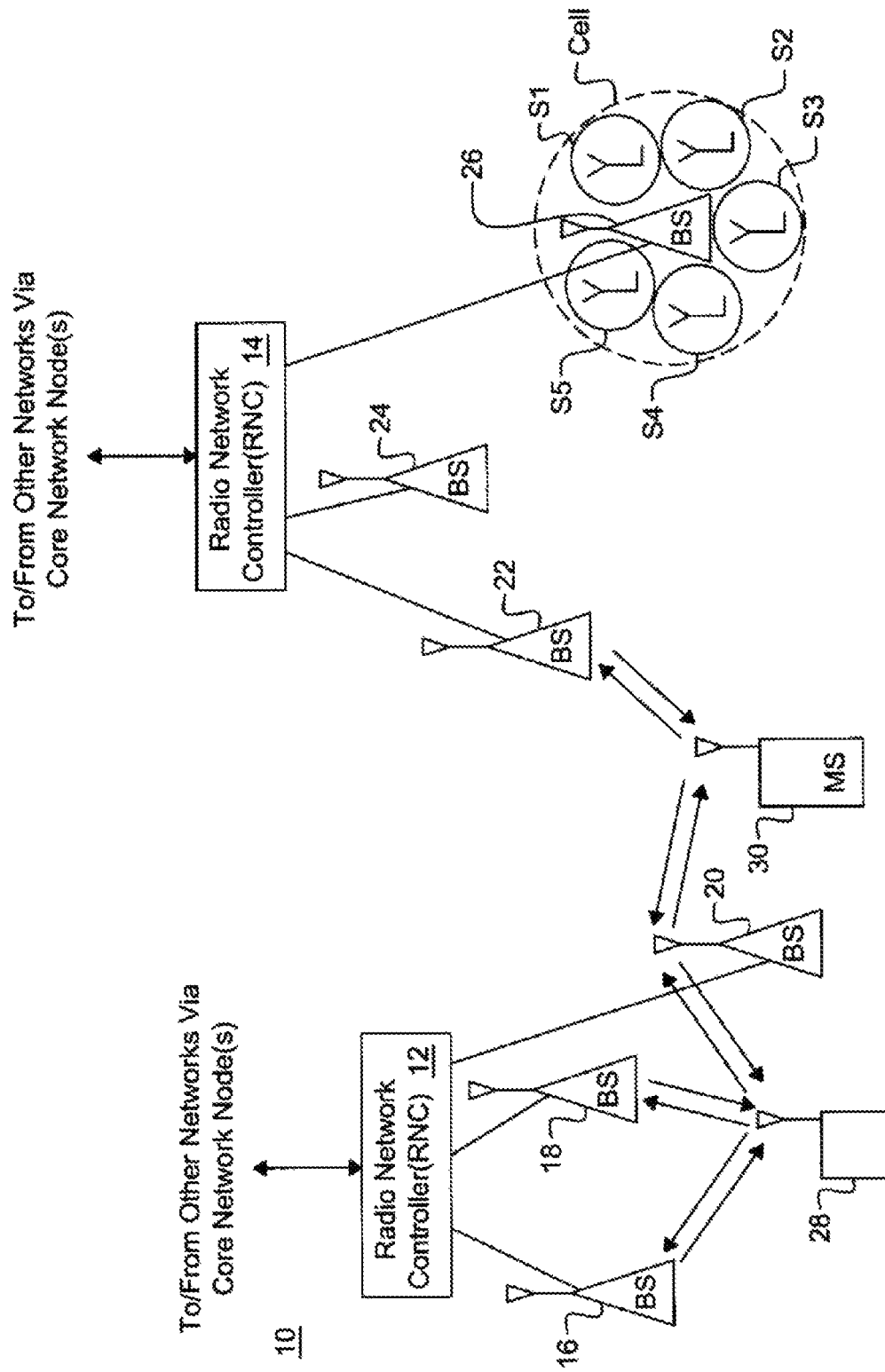
FIG. 1 is a schematic block diagram of a cellular communication system in which embodiments described herein may be implemented.

The term "UE" is used throughout this description as a non-limiting term which means any wireless device or node, e.g. PDA, laptop, mobile, sensor, fixed relay, mobile relay or even a small base station that is being positioned when timing measurements for positioning are considered, i.e. a LCS target in general. The UE may also be an advanced UE capable of such advanced features as carrier aggregation.

A cell is associated with a radio network node, where a radio network node comprise in a general sense any node capable of transmitting and/or receiving radio signals that may be used for positioning and/or measurements, such as e.g., an eNodeB, macro/micro/pico base station, home eNodeB, relay, beacon device, or repeater. The radio network node may be a single-RAT or multi-RAT or multi-standard radio base station. Note that downlink and uplink transmissions do not need to be between the UE and the same radio network node.

A positioning server described in different embodiments is a node with positioning functionality. The terms "positioning server" and "positioning node" are used synonymously herein. For example, for LTE it may be understood as a positioning platform in the user plane, e.g., SLP in LTE, or a positioning server in the control plane, e.g., E-SMLC in LTE. SLP may also consist of SLC and SPC, as explained above, where SPC may also have a proprietary interface with E-SMLC. In a testing environment, at least the positioning server may be simulated or emulated by test equipment.

The signalling described in the different embodiments is either via direct links or logical links, e.g. via higher layer protocols such as RRC and/or via one or more network nodes. For example, in LTE in the case of signalling between E-SMLC and the LCS Client the positioning result may be transferred via multiple nodes, at least via MME and Gateway Mobile Location Centre GMLC.

Herein the term "measurement indication" will be used to refer to a message which provides information related to a measurement to allow for monitoring of a predetermined threshold with respect to parallel reporting criteria of a UE. The measurement indication may comprise different types of information. If the predetermined threshold to be monitored relates to a limit on the total number of parallel reporting criteria of the UE, the measurement indication may be a simple message indicating that the UE is requested to perform a measurement. However, if the predetermined threshold relates to a specific category of measurement the measurement indication will need to include enough information to determine the measurement category to which the measurement indication relates. The measurement indication may also contain additional information such as information specifying a frequency to which the measurement relates, information relating to timing of reference signals to be used for the measurement and other parameters which may be required for configuration of the measurement. Specific measurement indications may be used for specific types of measurements, such as mobility measurements and different types of position measurements e.g. OTDOA measurement and E-CID measurements.

At least in some embodiments, inter-frequency measurements in the current invention shall be understood in a general sense comprising, e.g., inter-frequency, inter-band, or inter-RAT measurements. Some non-limiting examples of inter-frequency positioning measurements are inter-frequency E-CID measurements such as UE Rx-Tx time difference, RSRP and RSRQ, and inter-frequency RSTD measurements for OTDOA positioning.

At least some embodiments described herein are not limited to LTE, but may apply with any RAN, single- or multi-RAT. Some other RAT examples are LTE-Advanced, UMTS, GSM, cdma2000, WiMAX, and WiFi.

As mentioned above FIG. 1a shows a positioning architecture. As illustrated in FIG. 1a there is an interface 163, e.g. X2, between the two eNodeBs 110a and 110b and an interface 164 between an eNodeB and a network management and/or operation and maintenance (O&M) block 141. The positioning node or positioning server 140 is here assumed to be an E-SMLC server in E-UTRAN. The protocol for messaging between the E-SMLC 140 and the eNodeBs 110a is called LPPa. The radio interface protocol between the E-SMLC 140 and the UE 150a, 150b is called LPP. Note that a link between different network entities may be a physical or a logical link. A path for higher layer protocols is a logical link which may comprise one or several physical links.

Assuming an architecture such as shown in FIG. 1a, exemplary embodiments will be described below.

When positioning is used a mechanism is needed for monitoring the total number of configured parallel reporting criteria. The fact that positioning measurements and non-positioning measurements generally are configured or requested by different network nodes complicates the monitoring since no network node has full knowledge of all configured measurements. Embodiments which address this will be described in detail below. The embodiments focus on the following major aspects:

First, methods of obtaining information regarding measurements requested by different network nodes, such as methods in a network node of determining the total number of configured parallel measurement reporting criteria for the UE which is capable of supporting the positioning measurements.

Second, methods in the network node of configuring, i.e., increasing or decreasing, the number of parallel measurement reporting criteria when at least one positioning measurement reporting category is used. This configuration may include increasing or decreasing the total number of parallel reporting criteria.

Third, pre-defined rules enabling the UE to configure measurements that fulfill requirements on parallel reporting criteria. The UE may e.g. apply pre-defined rules according to which certain specific measurements, e.g., OTDOA measurements, are always performed when the total number of parallel measurement reporting criteria exceeds a certain threshold.

As described earlier, the UE requirements in terms of performing parallel intra-frequency, inter-frequency and inter-RAT measurements in E-UTRAN are specified in 3GPP TS 36.133, which lists the minimum number of reporting criteria that the UE shall be able to support in parallel per measurement category. In total there are 21 parallel reporting criteria, which are primarily related to the mobility measurements and which are configured by the eNodeB. The UE is not required to support more than 21 reporting criteria in parallel. Accordingly the UE has a limited capability for parallel reporting criteria, i.e. it is capable to support a limited number of reporting criteria in parallel. It is to be noted however that the UEs capability of parallel reporting criteria may be higher than the requirements according to 3GPP TS 36.133. The above UE requirements enable the eNodeB to configure an appropriate number of parallel measurements. Otherwise, if the configured criteria are larger than 21 then the UE cannot meet the desired performance for the configured measurements.

However, the positioning measurements, e.g., E-CID and intra-frequency RSTD and inter-frequency RSTD, may be configured by the positioning node. The E-CID measurement, e.g., UE Rx-Tx time difference measurement may also be configured by the eNodeB. This means the UE can be configured to report the UE Rx-Tx time difference measurement to the eNodeB and the E-SMLC in parallel. When any of the positioning measurements are performed by the UE, the eNodeB should be aware of these additional positioning measurements, which are configured by a different node, i.e., positioning node and not eNodeB, if the eNodeB is to be able to ensure that requirements on parallel reporting criteria are not exceeded for the UE. Further, positioning measurements may also be intra-frequency, inter-frequency, and inter-RAT measurements.

There may also be UL positioning measurements which are not UE measurements, but for which other UE measurements may also be needed. For instance, UE UL Tx power and power headroom may also be useful for estimating UL path loss or for properly configuring the UL measurements while taking UE power into account. The UE power can provide information about, for example, the cell coverage or changes in coverage when power changes for the given transport format.

Some embodiments of this disclosure enable:
a first network node to acquire information about the configured parallel measurement reporting criteria for the UE which is capable of performing positioning measurements; and
the first network node to adjust or reconfigure the parallel measurement reporting criteria when the total number exceeds a certain number for the UE which supports positioning measurements.

The embodiments described in detail below, refer to first, second, and/or third network nodes/nodes, which for this disclosure are defined as follows:
First network node: This is a network node that is capable of configuring the UE to perform at least one measurement. The measurement can be of any type, e.g., mobility, positioning, etc. It is also the network node that acquires the information about any measurement configured by another node. Examples of the first network node are: base station (e.g., eNodeB), network controller (e.g., BSC, RNC etc), relay node, donor node serving relay, SON node, measurement unit (e.g., LMU), etc.

Second network node: This is a node that can only configure one or more positioning measurements, e.g., RSTD, E-CID etc. Examples of a second node are: positioning nodes e.g., E-SMLC or SLP.

Third (network) node: This is a network node that can provide information to the first network node or to the second network node about at least one measurement, which can be configured by any other node. The third node may also be the user equipment and will therefore be referred to as 'the third node' rather than 'the third network node' in the following. In some cases, the third node and the first network node can be the same. Also, in some cases the third node and the second network node can be the same. Examples of the third node are: user equipment, base station (e.g., eNodeB), core network (e.g., MME/access gateway) positioning node (e.g., E-SMLC), network controller (e.g., BSC, RNC etc), relay node, donor node serving relay, SON node, minimization of drive test (MDT) node etc.

According to some exemplary embodiments a network node determines configured parallel reporting criteria. The network node, which may be the first network node or the second network node, determines the configured parallel measurement reporting criteria based on information obtained from the third node. Several examples are described below.

According to one example the first network node determines configured parallel reporting criteria by explicit signaling from one or several third nodes. The first node may be a radio network node, e.g., eNodeB, relay node, donor eNodeB etc. as described above. The first node acquires information or an indication about configured positioning measurements from the third node. The third note sends an explicit measurement indication to the first network node. In one variant the third node is a positioning node such as an E-SMLC in LTE. When the positioning node configures the UE to perform the positioning measurements (e.g., RSTD) it also signals a measurement indication with relevant information about the positioning measurement to the radio network node (e.g., eNodeB) i.e. to the first network node. The measurement indication may be sent to the eNodeB using the LPPa protocol. The measurement indication may comprise information on types of configured positioning measurements, e.g., intra-frequency RSTD, inter-frequency RSTD, E-CID UE Rx-Tx time difference etc. As mentioned above, the E-SMLC sends the assistance data to the UE for performing the positioning measurements. The E-SMLC may also forward this information element (IE) containing the assistance data or any information about the positioning measurement to the eNodeB as the measurement indication. Hence the idea of this embodiment is that the positioning node (E-SMLC) indicates to the eNodeB the type of positioning measurements, which have been requested by the positioning node to be performed by the UE. The eNodeB can then use the received information to configure the UE with appropriate number of measurements.

Another example of the third node is a the core network node e.g. a MME. When the MME requests the E-SMLC to initiate the positioning session, the indication about the possible positioning measurements is also signaled to the radio network node e.g., over the S1 interface to the eNodeB from the MME.

Yet another example of the third node is the network management node, e.g., a Self Organizing Network (SON) node or a Minimizing Drive Test (MDT) node, which might be aware of the ongoing positioning measurements. Hence the network management node may signal this information or any indication to the radio network node as the measurement indication.

Still another example of the third node is the user equipment (e.g., user terminal, target device etc), which is configured by the positioning node to perform one or more positioning measurements. The UE can therefore signal the information about the configured positioning measurements (e.g., intra-frequency RSTD, inter-frequency RSTD, E-CID etc) to its serving radio network node (e.g., eNodeB). The measurement indication can be a simple indication, e.g., identifiers of the configured measurement. The UE may also forward the received positioning measurement configuration IE or part of it to the serving radio network node. According to another aspect of the measurement indication, the UE may also send an indication when the total number of parallel measurement reporting criteria exceeds a threshold. The threshold may correspond to the minimum requirements pre-defined in the standard or any suitable pre-determined or configured value. Furthermore, the parallel measurements may correspond to all types of configured measurements (e.g., mobility, positioning etc) or they may correspond to a specific type of measurements, e.g., only positioning measurements configured by the positioning node.

Based on the measurement indication from one or more third nodes described above, the first network node (e.g., eNodeB) can determine the parallel positioning measurements configured by the positioning node. The first network node is thus aware of the measurements that the UE is requested to perform, both positioning measurements requested by the positioning node as well as measurements requested by the first network node. The radio network node can then take appropriate action as will be described below.

According to another exemplary embodiment the second network node determines parallel reporting criteria by explicit signaling from the third node. This embodiment is similar to the previously described embodiment in which the first network node determined the parallel reporting criteria. In this embodiment, however, the second node (e.g., positioning node) acquires the information or an indication about the configured measurements from the third node. Furthermore, the configured measurements correspond to any measurements which are configured by the first network node, e.g., eNodeB. The configured measurements may be e.g. mobility or positioning measurements.

Similar to the previously described embodiment, the second network node may determine the number of configured parallel measurements by receiving the measurement indication or relevant information from one or more of the following third nodes:

radio network node, e.g., eNodeB, which may send the measurement indication using LPPa, core network node, e.g., MME, network management node, e.g., SON node the UE, e.g., terminal, target device etc, using e.g. the LPP or LPPe protocol.

It is also possible that the UE signals the maximum number of supported reporting criteria, in total or per carrier, e.g., over LPP, LPPe or RRC to the second network node (e.g. E-SMLC) so that the second network node is made aware of one or several relevant thresholds related to supported parallel reporting criteria. Alternatively or additionally the UE may also signal the number of frequencies available for OTDOA. The second network node (E-SMLC) takes the received information into account when creating neighbor cell lists for the UE.

Based on the measurement indication from one or more third nodes described above, the second network node (e.g., E-SMLC) can determine the parallel measurements configured by the first network node. The second network node can then take appropriate action as will be described below.

Instead of using explicit signaling for conveying the measurement indication, alternative exemplary embodiments use packet sniffing. These alternative embodiments are useful in the event that e.g. the eNodeB does not have explicit information about the positioning measurements to be carried out by the UE. The eNodeB sniffs packets with LPP or similar messages, or information elements that are sent to the UE by the positioning sever (e.g., E-SMLC). The eNodeB may also read the messages or measurement reports sent by the UE to the positioning sever. The messages from the E-SMLC to the UE contain the assistance information to be used by the UE for performing the positioning measurements (e.g., intra-, inter-frequency RSTD, carrier aggregation RSTD etc). The messages from the UE contain the measurement results about the positioning measurements. These messages pass over the eNodeB transparently. Hence the eNodeB can sniff these messages by reading and inspecting the headers of these messages. The acquired assistance information by the virtue of sniffing enables the eNodeB to know about the configured positioning measurements.

In another embodiment, the eNodeB counts separately the number of higher-layer protocol sessions associated with the UE, where the higher-layer protocol sessions may be parallel LPP sessions that use RRC as transport. The eNodeB also tracks the total number of parallel sessions for the UE, including those associated with positioning and compares to the maximum pre-defined limit.

Accordingly there are several different alternatives for the first or second network node to obtain information about UE measurements which are requested or configured by different network nodes. Once the information about the measurements is obtained, this information can be used to control that the UE is configured with appropriate number of measurements with respect to limits on parallel reporting criteria.

According to exemplary embodiments, if it is determined that the configured total parallel measurement reporting criteria for the UE exceed a certain threshold, the first network node or the second network node or both nodes reconfigure the parallel measurements.

The reconfiguration of the parallel measurement reporting criteria depends upon the pre-defined requirements of parallel reporting criteria. The requirements of parallel reporting criteria may be unchanged, i.e. as defined in 3GPP TS 36.133 V9.3.0 as explained above, or may be extended with specific requirements for e.g. positioning measurements.

One embodiment extends the list of reporting criteria by introducing additional reporting criteria, specifically for LTE positioning for the UE which supports this positioning capability. This means, for example, extending the pre-defined criteria from 21 to 21+N, where the additional N criteria are for positioning measurements. N may for example be 4 to accommodate a UE Rx-Tx time difference measurement configured by E-SMLC, a UE Rx-Tx (or E-CID in general) time difference measurement configured by eNodeB, an intra-frequency RSTD measurement and an inter-frequency RSTD measurement.

Accordingly the standard 3GPP TS 36.133 could be updated with new reporting criteria categories as shown in the table below:

| Measurement category | $E_{cat}$ | Note |
|---|---|---|
| Intra-frequency | 9 | E-UTRA intra-frequency cells |
| Intra-frequency UE Rx-Tx time difference (*) | 1 | Intra-frequency UE Rx-Tx time difference measurement reported to E-UTRAN for UE supporting E-CID |
| Intra-frequency E-CID (*) | 1 | Intra-frequency E-CID measurements reported to E-SMLC for UE supporting E-CID |
| Intra-frequency RSTD (*) | 1 | Intra-frequency RSTD measurement reporting for UE supporting OTDOA |
| Inter-frequency | 7 | E-UTRA inter-frequency cells |
| Inter-frequency RSTD (*) | 1 | Inter-frequency RSTD measurement reporting for UE supporting OTDOA |
| Inter-RAT (E-UTRAN FDD or TDD, UTRAN FDD, UTRAN TDD, GSM, cdma2000 1 × RTT and HRPD) | 5 | Only applicable for UE with this (inter-RAT) capability. This requirement ($E_{cat}$ = 5) is per supported RAT. |

(*) example new reporting criteria categories

The table above indicates that the UE shall be able to support in parallel per category up to $E_{cat}$ reporting criteria.

In another example, N is 3 and additional measurement reporting categories are UE Rx-Tx time difference, intra-frequency RSTD and inter-frequency RSTD.

In a further example, N is 3 and additional measurement reporting categories are intra-frequency E-CID measurements configured by eNodeB, intra-frequency positioning measurements (E-CID or OTDOA) configured by positioning node and inter-frequency RSTD (or OTDOA) measurements.

In yet another example, inter-frequency E-CID measurements may also be added to the list of reporting criteria categories. According to an embodiment Rx-Tx difference measurements are defined for a non-serving/non-primary carrier in LTE, e.g., intra-frequency UE Rx-Tx for neighbor cells and inter-frequency Rx-Tx measurements for neighbor cells, where inter-frequency Rx-Tx may further be UE Rx-Tx and E-UTRAN Rx-Tx. This may also apply for carrier aggregation (CA) networks and CA-capable UEs.

In still another example, at least one new reporting criterion is added for inter-RAT positioning measurements, which may also be specified for different positioning methods separately or by the initiating node, e.g., the positioning node or the eNodeB.

According to a further example, for multi-carrier and/or CA systems, the set of reporting criteria for positioning may be further defined for primary and non-primary (i.e. secondary) carriers, e.g., as in the table below:

| Measurement category | $E_{cat}$ | Note |
|---|---|---|
| Intra-frequency | 9 | E-UTRA intra-frequency cells |
| Intra-frequency UE Rx-Tx time difference, primary carrier (*) | 1 | Intra-frequency UE Rx-Tx time difference measurement reported to E-UTRAN for UE supporting E-CID |
| Intra-frequency E-CID, primary carrier (*) | 1 | Intra-frequency E-CID measurements reported to E-SMLC for UE supporting E-CID |
| Intra-frequency RSTD, primary carrier (*) | 1 | Intra-frequency RSTD measurement reporting for UE supporting OTDOA |
| Intra-frequency UE Rx-Tx time difference, secondary carrier (*) | 1 | Intra-frequency UE Rx-Tx time difference measurement reported to E-UTRAN for UE supporting E-CID |

-continued

| Measurement category | $E_{cat}$ | Note |
|---|---|---|
| Intra-frequency E-CID, secondary carrier (*) | 1 | Intra-frequency E-CID measurements reported to E-SMLC for UE supporting E-CID |
| Intra-frequency RSTD, secondary carrier (*) | 1 | Intra-frequency RSTD measurement reporting for UE supporting OTDOA |
| Inter-frequency | 7 | E-UTRA inter-frequency cells |
| Inter-frequency RSTD, primary carrier (*) | 1 | Inter-frequency RSTD measurement reporting for UE supporting OTDOA |
| Inter-frequency RSTD, secondary carrier (*) | 1 | Inter-frequency RSTD measurement reporting for UE supporting OTDOA |
| Inter-RAT (E-UTRAN FDD or TDD, UTRAN FDD, UTRAN TDD, GSM, cdma2000 1 x RTT and HRPD) | 5 | Only applicable for UE with this (inter-RAT) capability. This requirement ($E_{cat}$ = 5) is per supported RAT. |

(*) example new reporting criteria categories

As mentioned above it is also possible that the total measurement reporting criteria requirement is unchanged, i.e. as specified in 3GPP TS 36.133 V9.3.0, even for the UE which supports the positioning feature.

It is particularly important that the node, which is to control that requirements on parallel reporting criteria are not exceeded, is able to reconfigure the parallel measurements in the case that the total measurement reporting criteria including positioning measurements are the same as without positioning measurements. Assuming that the eNodeB is to control that limits on parallel reporting criteria are not exceeded it is important that the eNodeB is made aware of the UE positioning capabilities and also when the UE performs a particular positioning measurement. The positioning node (e.g. E-SMLC) or any other network node may indicate to the eNodeB the UE positioning measurement capabilities of the UE. The positioning node also indicates which type of positioning related measurements are currently requested to be performed by the UE. Alternatively the UE itself reports its measurement capability (e.g., enhanced cell ID etc) to the eNodeB. The eNodeB can use this information to configure the UE with the appropriate number of measurements without exceeding a desired limit, such as the capability requirement, supported parallel reporting criteria or other lower limit. In addition the E-SMLC may acquire the UE measurement capability and use it to set appropriate parameters in the assistance data to be used by the UE for performing the positioning measurements.

The eNodeB can for example reduce the number of parallel measurements for mobility in the event that the positioning node configures the UE to perform positioning measurements, thereby giving the positioning measurements priority over the mobility measurements. For example, assume that the positioning node configures the UE to perform intra-frequency RSTD measurements, while the eNodeB has also configured UE to perform and report 21 parallel measurements. Upon acquiring this information, the eNodeB may de-configure one of the mobility measurements e.g., periodic RSRP reporting. According to another example the positioning node configures the UE to perform intra- and inter-frequency RSTD measurements while the eNodeB has configured 21 parallel measurements for mobility purposes. In this case, the positioning node may de-configure the inter-frequency RSTD measurement. Alternatively, the positioning node may also explicitly request the eNodeB to de-configure one of the mobility measurements to make sure that total configured measurements do not exceed the UE measurement capability requirement with respect to parallel reporting criteria.

Even if the total requirement on parallel measurement reporting criteria is extended with specific criteria for positioning, the network may still benefit from the acquired information about the requested parallel UE measurements. Assume that the total UE parallel measurement capability is 25 including positioning measurements. The positioning measurements are not used all the time for all UEs. Further assume that the eNodeB does not receive any measurement indication that the UE is currently doing any positioning measurements. Hence the eNodeB can configure the UE to perform additional parallel measurements for mobility or for any other purpose such as for network planning, SON, MDT etc i.e., more than 21 measurements. In this way the performance of the mobility or other network operation can be enhanced by dynamically adjusting/configuring the parallel measurement reporting criteria.

In summary, the network node (i.e., first and/or second network node) uses the following set of information to configure or reconfigure appropriate number of measurements, without exceeding the desired limit:

Obtained information regarding parallel UE measurements that are requested or configured by different network nodes.

Information related to the desired limit, such as requirements for the parallel measurement reporting criteria or other predetermined threshold relating to the total number of parallel measurements or to one or several specific categories of measurements.

The above described measurement indication is used to convey information to a network node about UE measurements requested or configured by another network node. However, such a measurement indication may not be needed if the UE itself is able to control that the configured measurements do not exceed the predetermined threshold(s) of parallel reporting criteria. According to an exemplary embodiment the UE itself controls the configuration of parallel measurements to ensure that one or several predetermined thresholds for parallel reporting criteria are not exceeded. This control is based on a pre-defined rule in the UE. According to this embodiment, when the total number of configured parallel measurement criteria exceeds the predetermined threshold(s), e.g., predefined requirements such as 21, the UE autonomously decides which of the measurements should be prioritized or performed and which one should not be performed or delayed. The autonomous decision in the UE is based on the pre-defined rule. For instance it can be pre-defined that a particular type of measurement shall always be performed. This means that the UE may have to stop reporting another low priority measurement, e.g., periodical RSRP.

For example, it can be predefined that an OTDOA measurement shall always be performed by the UE in case the total number of parallel reporting criteria exceeds the threshold. It may even be predefined that a particular type of OTDOA measurement (e.g., intra-frequency RSTD) shall always be performed by the UE in case the total number of parallel reporting criteria exceeds the threshold. Another exemplary rule could be that at least two positioning measurements are always performed by the UE. This is to make sure that the emergency call requirements are met or at least the emergency calls are furnished. Another exemplary rule could be that measurements tagged with a higher priority are always performed by the UE. The priority tag can be signaled for the configured measurement, or it can be predefined in a standard.

Figure 6:
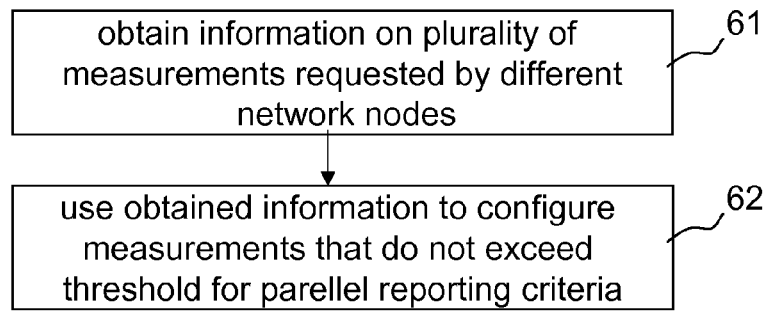
FIG. 6 is a flow diagram illustrating an exemplary method of controlling configuration of measurements to be performed by the UE.

FIG. 6 is a flow diagram illustrating an exemplary method of controlling configuration of measurements to be performed by the UE in line with the description above. The method may be performed in the first network node or the second network node or even in the UE itself. A first step 61 of the method involves obtaining information on a plurality of measurements requested by a plurality of different network nodes to be performed by the user equipment in parallel. The plurality of measurements includes at least one positioning measurement. The step 61 may involve receiving a measurement indication from one or several of the network nodes that request measurements as explained above.

The obtained information may include information on type of positioning measurement and the number of positioning measurements of each type of requested positioning measurement. Information on type of positioning measurement may e.g. specify is the positioning measurement is an OTDOA or E-CID measurement. Alternatively or additionally the type of OTDOA or E-CID measurement is specified, such as intra-frequency UE Rx-Tx time difference for a serving cell, intra-frequency RSTD and inter-frequency RSTD for OTDOA measurement, or intra-frequency UE Rx-Tx time difference for a neighbor cell, inter-frequency UE Rx-Tx measurement, and inter-frequency E-UTRAN Rx-Tx measurement, and inter-RAT positioning measurement for E-CID measurement.

In a step 62, the obtained information is used to configure the user equipment with a set of measurements that does not exceed at least one predetermined threshold for parallel reporting criteria. The set of measurements comprises all or a subset of the plurality of measurements requested by the plurality of different network nodes. The step 62 may involve reconfiguration to reduce or delay previously configured measurements of a specific type as explained above. The one or several predetermined thresholds for parallel reporting criteria may specify a maximum total number of parallel reporting criteria and/or a maximum number of parallel reporting criteria per measurement category. There may be different levels of measurement categories. On a higher level there may e.g. be a category for positioning measurements and a category for non-positioning measurements. On a more specific level there may e.g. be a measurement category for OTDOA positioning measurements and a category for E-CID positioning measurements. OTDOA and E-CID positioning measurements may then be categorized in different types of measurements as exemplified above.

The measurements requested to be performed by the user equipment maybe measurements to be performed on a primary carrier and/or a secondary carrier.

As mentioned above obtaining the information on the requested measurements may e.g. involve sniffing messages transmitted between the UE and a positioning server or receiving measurement indications signaled from the third node. The third node will thus need to be configured to transmit the measurement indications. Different embodiments of the third node are possible as is apparent from the following itemized list of exemplary embodiments of the third node:

Embodiment 1 : A third node of a wireless communication system of supporting configuration of measurements to be performed by a user equipment operating in the wireless communication system, wherein a configured measurement corresponds to at least one reporting criteria, wherein the user equipment is able to support a limited number of parallel reporting criteria, wherein a plurality of different network nodes are adapted to request a plurality of measurements to be performed by the user equipment in parallel, and wherein said plurality of measurements includes at least one positioning measurement, the third node comprising a transmitter configured to transmit to another network node information on at least one measurement requested by at least one of said plurality of different network nodes to be performed by the user equipment to enable said another network node to monitor that the user equipment is not configured with a set of measurements that exceeds at least one predetermined threshold for parallel reporting criteria.

Embodiment 2: The third node according to embodiment 1, wherein the third node is a positioning server, which is one of said plurality of different network nodes and wherein said another network node is an eNodeB.

Embodiment 3: The third node according to embodiment 2, wherein said transmitter is configured to include, in the information sent to the eNodeB, information on any positioning measurements that the positioning server is requesting the user equipment to perform in parallel.

Embodiment 4: The third node according to embodiment 3, wherein said information on the positioning measurements includes information on any positioning measurements of type intra-frequency UE Rx-Tx time difference for a serving cell, intra-frequency RSTD, inter-frequency RSTD, intra-frequency UE Rx-Tx time difference for a neighbor cell, inter-frequency UE Rx-Tx measurement, inter-frequency E-UTRAN Rx-Tx measurement, and inter-RAT positioning measurement that the user equipment is requested to perform.

Embodiment 5: The third node according to embodiment 1, wherein said third node is the user equipment.

Embodiment 6: The third node according to embodiment 1, wherein said third node is an eNodeB, which is one of said plurality of different network nodes and wherein said another network node is a positioning server.

Figure 7:
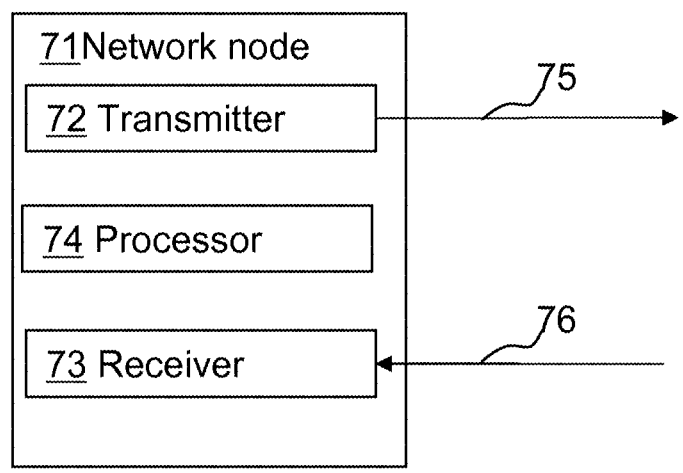
FIG. 7 is a schematic block diagram illustrating an embodiment of a network node.

FIG. 7 is a schematic block diagram of a network node 71 for controlling configuration of measurements to be performed by the user equipment. The network node 71 may be the first network node or the second network node. The network node 71 comprises a receiver 73, a transmitter 72 and a processor 74, which are particularly configured for carrying out the method illustrated in FIG. 6. The receiver is particularly configured to obtain information regarding requested UE measurements e.g. in the form of the above described measurement indication, which is illustrated here as an arrow indicated by reference numeral 76. The processor may obtain information regarding measurements that the network node 71 itself configures or requests. The processor is also configured to use the obtained information to configure a set of measurements that does not exceed the predetermined threshold(s) for parallel reporting criteria and the transmitter is configured to transmit configuration information 75 to the UE to initiate the UE to perform the configured set of measurements.

The functional blocks depicted in FIG. 7 can be combined and re-arranged in a variety of equivalent ways, and many of the functions can be performed by one or more suitably programmed digital signal processors and other known electronic circuits e.g., discrete logic gates interconnected to perform a specialized function, or application-specific integrated circuits. Moreover, connections among and information provided or exchanged by the functional blocks depicted in FIG. 7 can be altered in various ways to enable the network node 71 to implement the methods described above and other methods involved in the operation of the network node in a wireless communication system.

As mentioned above the UE may be configured to use predefined rules to control that one or several predetermined thresholds for parallel reporting criteria are not exceeded. Thus different embodiments of the UE and methods performed in the UE are possible as is apparent from the following itemized list of embodiments:

Embodiment 7: A method in a user equipment of controlling configuration of measurements to be performed by the user equipment operating in a wireless communication system, wherein a configured measurement corresponds to at least one reporting criteria and wherein the user equipment is able to support a limited number of parallel reporting criteria, the method comprising obtaining information on a plurality of measurements requested by a plurality of different network nodes to be performed by the user equipment in parallel, wherein said plurality of measurements includes at least one positioning measurement, and using the obtained information to configure the user equipment with a set of measurements that does not exceed at least one predetermined threshold for parallel reporting criteria.

Embodiment 8: The method according to embodiment 7, wherein the obtained information includes information on any type of positioning measurement that the user equipment is requested to perform.

Embodiment 9: The method according to embodiment 8, wherein the obtained information includes information on any positioning measurements of type intra-frequency UE Rx-Tx time difference for a serving cell, intra-frequency RSTD, inter-frequency RSTD, intra-frequency UE Rx-Tx time difference for a neighbor cell, inter-frequency UE Rx-Tx measurement, inter-frequency E-UTRAN Rx-Tx measurement, and inter-RAT positioning measurement that the user equipment is requested to perform.

Embodiment 10: The method according to any of embodiments 7-9, wherein the user equipment uses the obtained information to configure the user equipment with the set of measurements based on a predefined rule.

Embodiment 11: The method according to embodiment 10, wherein according to the predefined rule a type and/or number of positioning measurements is prioritized to be configured.

Embodiment 12: A user equipment for operating in a wireless communication system which includes a transmitter, receiver and processor which are configured to carry out the method according to any of embodiments 7-11.

The embodiments above generally provide a number of technical advantages, each of which are achieved by at least some embodiments. First, some embodiments of methods described above enable the network node to be aware of the configured total parallel measurements including positioning measurements. Second, some embodiments enable the positioning node to be aware of the configured total parallel measurements, including non-positioning measurements. Third, some embodiments described herein enable the network node ensure that requirements on parallel reporting criteria of the UE are not exceeded. Furthermore, some embodiments enable the positioning node to ensure that requirements on parallel reporting criteria of the UE are not exceeded.

Many aspects of the embodiments presented herein are described in terms of sequences of actions that can be performed by, for example, elements of a programmable computer system. Embodiments of UEs include, for example, mobile telephones, pagers, headsets, laptop computers and other mobile terminals, and the like. Moreover, some embodiments described herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber. Thus, there are numerous different embodiments in many different forms, not all of which are described above, that fall within the scope of the appended claims. For each of the various aspects, any such form may be referred to as "logic configured to" perform a described action, or alternatively as "logic that" performs a described action.

In addition, embodiments described above can be incorporated in user- and/or control-plane positioning solutions, although the latter is currently believed to be more common, and in other positioning methods and their hybrids, in addition to OTDOA and E-CID. It will be understood that this description is given in terms of an eNodeB as the radio network node, but the invention can be embodied in other types of radio network nodes, e.g., pico BSs, home NodeBs, etc.

Several of the embodiments described above use an LTE scenario as an exemplary application scenario. LTE standard specifications can be seen as an evolution of the current wideband code division multiple access (WCDMA) specifications. An LTE system uses orthogonal frequency division multiplex (OFDM) as a multiple access technique (called OFDMA) in a downlink (DL) from system nodes to user equipments (UEs). An LTE system has channel bandwidths ranging from about 1.4 MHz to 20 MHz, and supports throughputs of more than 100 megabits per second (Mb/s) on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH). LTE channels are described in 3GPP Technical Specification (TS) 36.211 V9.1.0, Physical Channels and Modulation (Release 9) (December 2009), among other specifications.

An IMT-Advanced communication system uses an internet protocol (IP) multimedia subsystem (IMS) of an LTE, HSPA, or other communication system for IMS multimedia telephony (IMT). In the IMT advanced system (which may be called a "fourth generation" (4G) mobile communication system), bandwidths of 100 MHz and larger are being considered. The 3GPP promulgates the LTE, HSPA, WCDMA, and IMT specifications, and specifications that standardize other kinds of cellular wireless communication systems.

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example, U.S. Patent Application Publication No. US 2008/0031368 A1 by B. Lindoff et al.

Figure 1A:
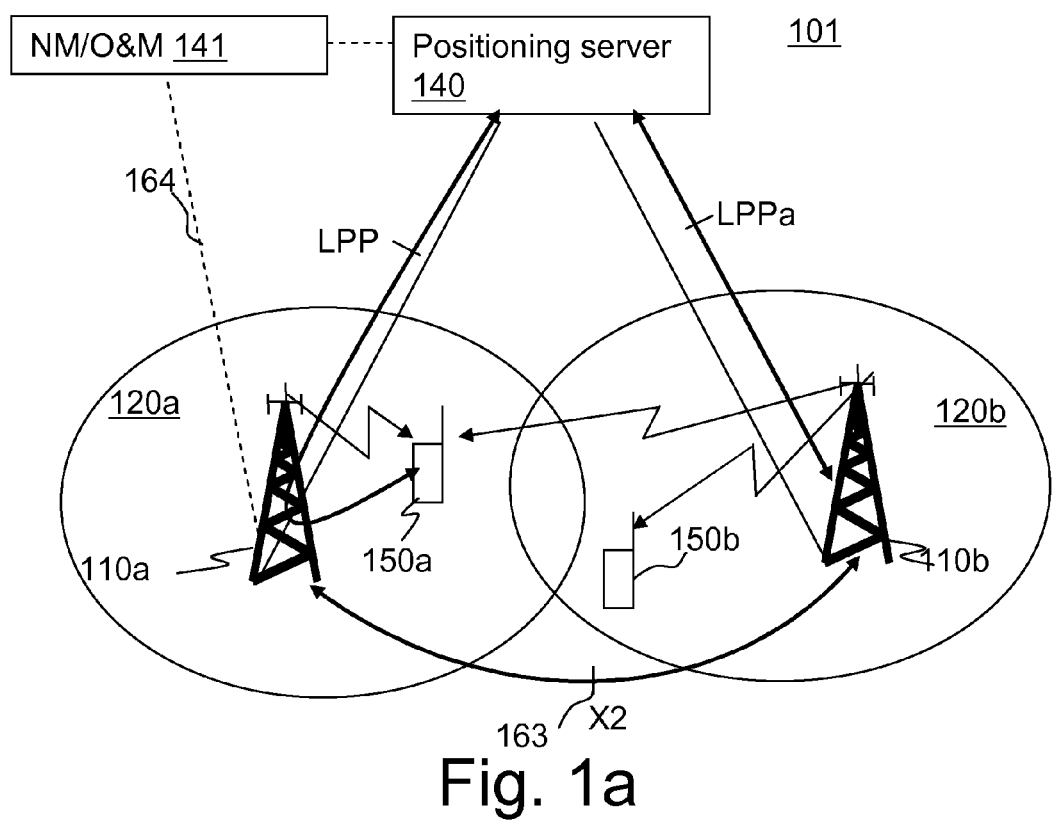
FIG. 1*a* is a schematic block diagram of wireless communication system, including a positioning server, in which embodiments described herein may be implemented.
Figure 2:
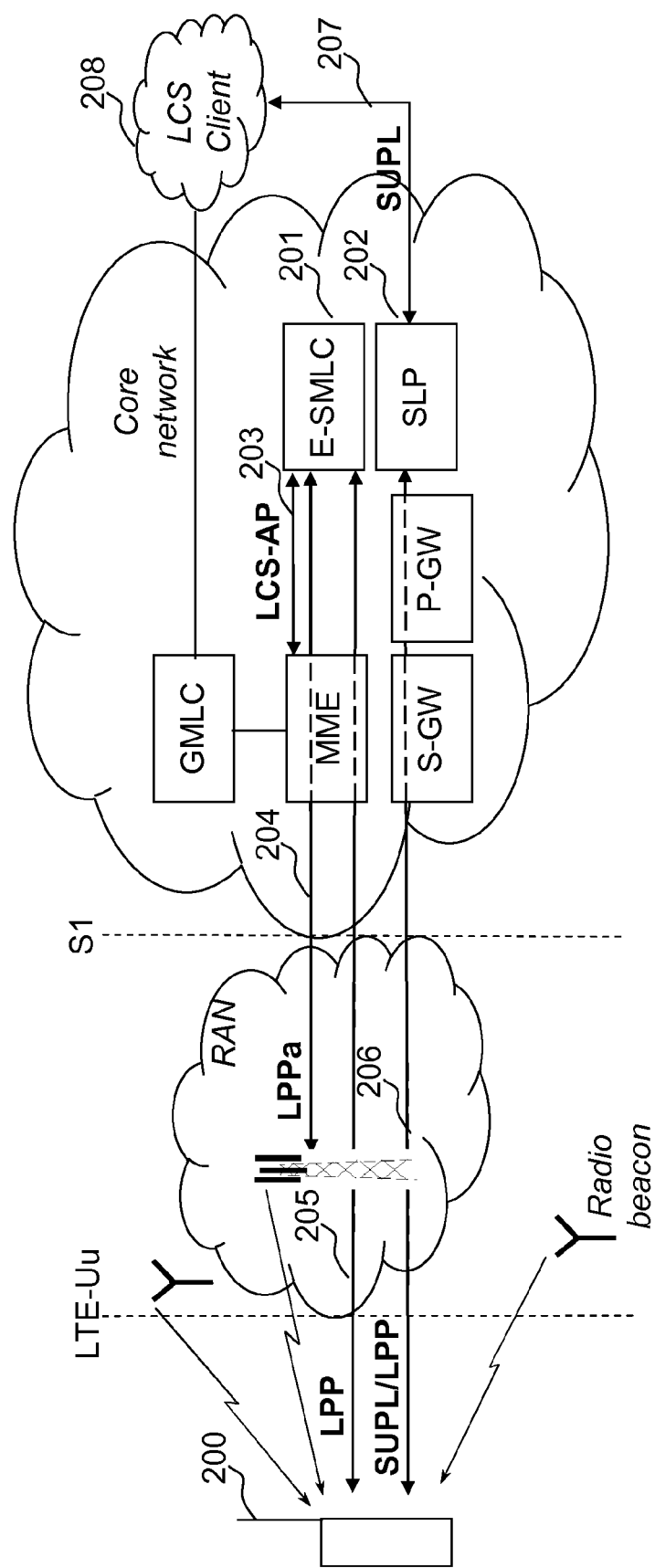
FIG. 2 is a schematic block diagram illustrating an LTE system with positioning functionality.
Figure 3:
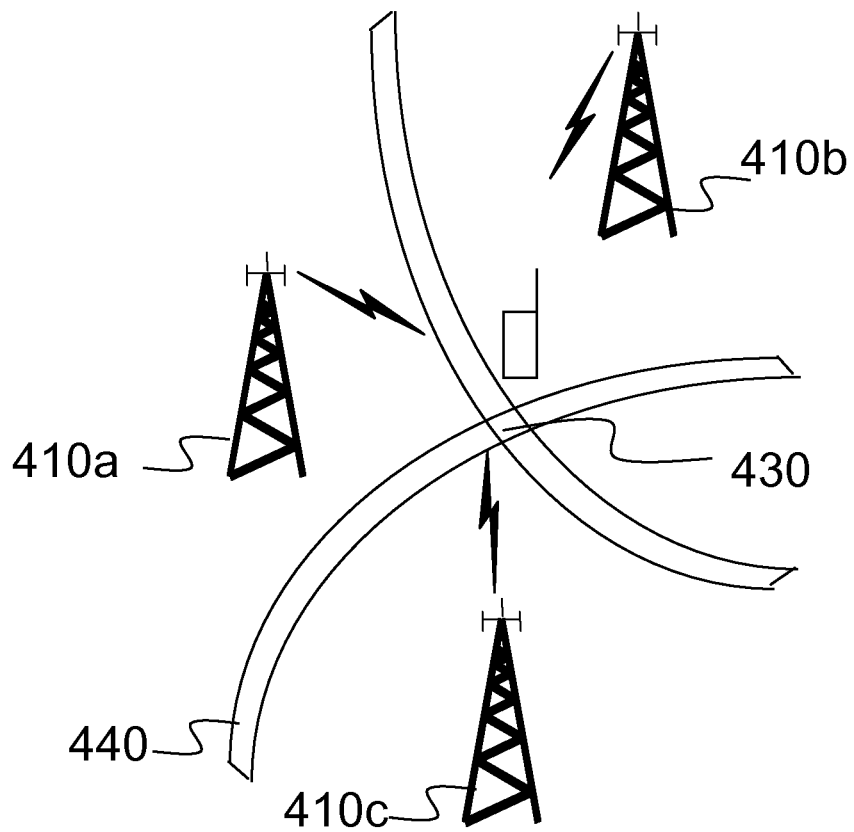
FIG. 3 is a schematic block diagram illustrating positioning of a user equipment (UE) by determining an intersection of hyperbolas corresponding to measured Reference Signal Time Differences (RSTDs).
Figure 4:
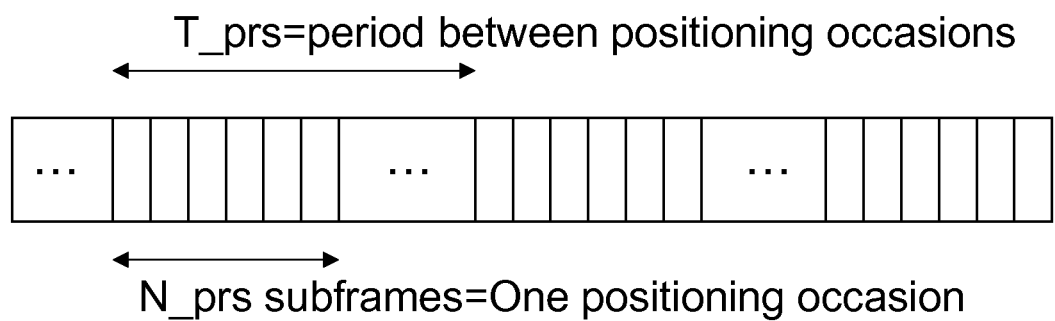
FIG. 4 is a schematic block diagram illustrating a measurement gap pattern.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26. Each BS, or eNodeB which is a BS in an LTE system, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE.

The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It will be understood that the arrangement of functionalities depicted in FIG. 1 can be modified in LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

The use of multiple antennas plays an important role in modern wireless communication systems, such as LTE systems, to achieve improved system performance, including capacity and coverage, and service provisioning. Acquisition of channel state information (CSI) at the transmitter or the receiver is important to proper implementation of multi-antenna techniques. In general, channel characteristics, such as the impulse response, are estimated by sending and receiving one or more predefined training sequences, which can also be called reference signals. To estimate the channel characteristics of a DL for example, a BS transmits reference signals to UEs, which use the received versions of the known reference signals to estimate the DL channel. The UEs can then use the estimated channel matrix for coherent demodulation of the received DL signal, and obtain the potential beam-forming gain, spatial diversity gain, and spatial multiplexing gain available with multiple antennas. In addition, the reference signals can be used to do channel quality measurement to support link adaptation.

In the case of OFDM transmission, a straightforward design of a reference signal is to transmit known reference symbols in the OFDM frequency-vs.-time grid. Cell-specific reference signals and symbols are described in Clauses 6.10 and 6.11 of 3GPP TS 36.211 V9.0.0, Evolved Universal Terrestrial Radio Access (E-UTRA), Physical Channels and Modulation (Release 9) (December 2009). Up to four cell-specific reference signals corresponding to up to four transmit antennas of an eNodeB are specified. Such reference signals are used by the eNodeB for codebook-based, multiple-stream, spatial multiplex transmission. A codebook is a pre-defined finite set of a number of precoding matrices having different ranks. In codebook based precoding, the UE estimates the channel matrix based on the cell-specific reference signals, carries out an exhaustive search over all precoding matrices, and reports a preferred precoding matrix indicator (PMI) to the eNodeB according to certain criteria, thereby maximizing system throughput, etc. The PMI determined by a UE can be overridden by the eNodeB.

3GPP TS 36.211 also defines a UE-specific reference signal on an antenna port 5 that is transmitted only on resource blocks upon which a corresponding physical downlink shared channel (PDSCH) is mapped. The UE-specific reference signal supports non-codebook based, single-stream beamforming transmission. In non-codebook based precoding, the precoding weight matrix applied both on UE-specific reference symbols and the data symbols is not from the codebook set but is directly calculated by the eNodeB in terms of various criteria, e.g., the weight matrix can be calculated based on eigen decomposition or on direction of arrival. In a time-division duplex (TDD) system, due to channel reciprocity, non-codebook based beamforming/precoding can reduce further uplink feedbacks and improve beamforming gain.

The DL of a LTE system can use both codebook-based precoding and non-codebook based beamforming/precoding for up to four transmit antennas. The transmission mode switch between codebook-based, multiple-stream spatial multiplexing transmission and non-codebook-based, single-stream beamforming transmission is semi-statically configured via higher layer signaling.

Some communication systems, such as LTE-Advanced that is currently being specified by 3GPP, can employ more than four transmit antennas in order to reach more aggressive performance targets. For example, a system having eNodeBs with eight transmit antennas need extension of current LTE codebook-based precoding from precoder and reference signal perspectives.

Figure 5:
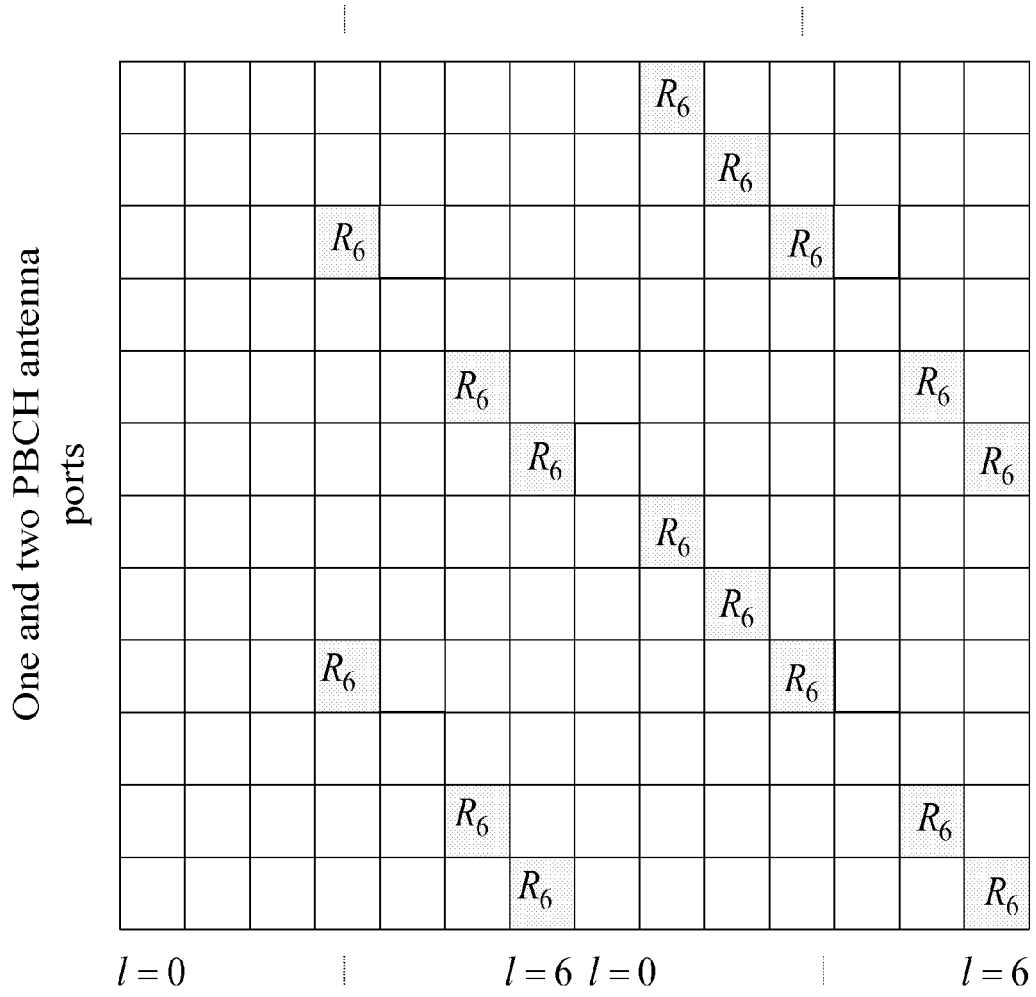
FIG. 5 is a schematic block diagram illustrating a Positioning Reference Signal pattern when one or two antennas are used for a Physical Broadcast Channel (PBCH).

PRS are transmitted from one antenna port (R6) according to a pre-defined pattern, as described for example in Clause 6.10.4 of 3GPP TS 36.211 V9.0.0, Evolved Universal Terrestrial Radio Access (E-UTRA), Physical Channels and Modulation (Release 9) (December 2009). One of the currently agreed PRS patterns is shown in FIG. 5, which corresponds to the left-hand side of FIG. 6. 10.4.2-1 of 3GPP TS 36.211, where the squares containing $R_6$ indicate PRS resource elements within a block of twelve subcarriers over fourteen OFDM symbols (i.e., a 1-ms subframe with normal cyclic prefix).

A set of frequency shifts can be applied to the pre-defined PRS patterns to obtain a set of orthogonal patterns which can be used in neighbor cells to reduce interference on the PRS and thus improve positioning measurements. The effective frequency reuse of six can be modelled in this way. The frequency shift is defined as a function of Physical Cell ID (PCI) as follows:

$$v_{shift} = \mathrm{mod}(PCI, 6).$$

in which $v_{shift}$ is the frequency shift, mod( ) is the modulo function, and PCI is the Physical Cell ID. The PRS can also be transmitted with zero power, or muted.

To improve hearability of the PRS, i.e., to enable detecting the PRS from multiple sites and with a reasonable quality, positioning subframes have been designed as low-interference subframes, i.e., it has also been agreed that no data transmissions are allowed in general in positioning subframes. As a result, synchronous networks' PRS are ideally interfered with only by PRS from other cells having the same PRS pattern index, i.e., the same vertical shift (v_shift), and not by data transmissions.

In partially aligned asynchronous networks, PRS can still be interfered with by transmissions over data channels, control channels, and any physical signals when positioning subframes collide with normal subframes, although the interference is reduced by the partial alignment, i.e., by aligning the beginnings of positioning subframes in multiple cells within one-half of a subframe with respect to some time base. PRS are transmitted in pre-defined positioning subframes grouped by several consecutive subframes ($N_{PRS}$), i.e., one positioning occasion, which occur periodically with a certain periodicity of N subframes, i.e., the time interval between two positioning occasions. The currently agreed periods N are 160, 320, 640, and 1280 ms, and the number of consecutive subframes $N_{PRS}$ can be 1, 2, 4, or 6, as described in 3GPP TS 36.211 cited above.

The invention claimed is:

1. A method, implemented in a network node, of controlling a configuration of measurements to be performed in parallel by a user equipment operating in a wireless communication system, wherein a configured measurement corresponds to at least one reporting criteria, and wherein the user equipment is configured to support a limited number of parallel reporting criteria, the method comprising:
   obtaining information on at least one measurement requested by another network node to be performed by the user equipment, wherein the at least one measurements includes at least one positioning measurement; and
   using the obtained information to configure the user equipment with a set of measurements such that the number of configured parallel reporting criteria for the set of measurements and the at least one measurement requested by the another network node does not exceed at least one predetermined threshold for parallel reporting criteria.

2. The method of claim 1, wherein the obtained information comprises information on:
   at least one category of positioning measurement;
   a number of configured positioning measurement reporting criteria for each category of positioning measurement.

3. The method of claim 2, wherein the information on the at least one category of the positioning measurement comprises information specifying that a category of positioning measurement comprises:
   an Observed Time Difference of Arrival (OTDOA);
   an Enhanced Cell ID (E-CID);
   an intra-frequency Reference Signal Time Difference for OTDOA measurement;
   an inter-frequency Reference Signal Time Difference for OTDOA measurement;
   an intra-frequency user equipment receive-transmit time difference for a neighbor cell for E-CID measurement;
   an inter-frequency user equipment receive transmit measurement for E-CID measurement; or
   an inter-radio access technology (RAT) positioning measurement for E-CID measurement.

4. The method of claim 1, wherein the at least one measurement requested to be performed by the user equipment comprises at least one measurements to be performed on at least one of a primary carrier and a secondary carrier.

5. The method of claim 1, wherein the another network node comprises a positioning server.

6. The method of claim 5, wherein the positioning server comprises an Evolved Serving Mobile Location Center (E-SLMC) or a Secure User Plane Location (SUPL) Location Platform (SLP).

7. The method of claim 1, wherein the another network node comprises a radio network node.

8. The method of claim 7:
   wherein the radio network node comprises an evolved NodeB (eNodeB).

9. The method of claim 1:
   wherein obtaining the information on the at least one measurements requested by the another network node comprises receiving at least one signaling message with information on at least one requested measurement from at least one third network node;
   wherein the third network node comprises one of:
      the another network node;
      the user equipment;
      a core network node;
      a Mobility Management Entity;
      a network management node;
      a Self Organizing Network node; or
      a Minimizing Drive Test node.

10. The method of claim 1 wherein obtaining the information on the at least one measurement requested by the another network node comprises sniffing at least one message transmitted between the user equipment and a positioning server to extract information on at least one positioning measurement.

11. The method of claim 1, wherein the at least one predetermined threshold for parallel reporting criteria comprises a threshold specifying a maximum total number of parallel reporting criteria.

12. The method of claim 1:
   wherein the at least one predetermined threshold for parallel reporting criteria specifies a maximum number of parallel reporting criteria per measurement category;
   wherein a plurality of different measurement categories are predefined to include different types of measurements.

13. The method of claim 12, wherein the plurality of different measurement categories comprises at least one category for positioning measurements.

14. The method of claim 13, wherein the at least one category for positioning measurements comprises at least one category for at least one of:
   an Observed Time Difference of Arrival (OTDOA);
   an Enhanced Cell ID (E-CID);
   an intra-frequency Reference Signal Time Difference for OTDOA measurement;
   an inter-frequency Reference Signal Time Difference for OTDOA measurement;
   an intra-frequency user equipment receive-transmit time difference for a neighbor cell for E-CID measurement;
   an inter-frequency user equipment receive transmit measurement for E-CID measurement; and
   an inter-radio access technology (RAT) positioning measurement for E-CID measurement.

15. The method of claim 1, wherein using the obtained information to configure the user equipment comprises delaying a previously configured measurement or initiating de-configuration of the previously configured measurement to give priority to one or several other measurements.

16. The method of claim 15, further comprising:
   delaying or de-configuring a mobility measurement to give priority to a positioning measurement; or
   delaying or de-configuring the positioning measurement to give priority to the mobility measurement.

17. A network node for controlling configuration of measurements to be performed in parallel by a user equipment operating in a wireless communication system, wherein a configured measurement corresponds to at least one reporting criteria, wherein the user equipment is configured to support a limited number of parallel reporting criteria, the network node comprising:
- a receiver;
- a transmitter;
- a processor;
- wherein the receiver and the processor are configured to obtain information on at least one measurement requested by another network node to be performed by the user equipment, wherein the at least one measurement comprises at least one positioning measurement;
- wherein the processor and the transmitter are configured to use the obtained information to configure the user equipment with a set of measurements such that the number of configured parallel reporting criteria for the set of measurements and the at least one measurement requested by the another network node does not exceed at least one predetermined threshold for parallel reporting criteria.

18. The network node of claim 17, wherein the obtained information comprises information on at least one category of positioning measurement and a number of configured positioning measurement reporting criteria for each category of positioning measurement.

19. The network node of claim 18, wherein the information on at least one category of positioning measurement comprises information specifying that a category of positioning measurement comprises:
- an Observed Time Difference of Arrival (OTDOA);
- an Enhanced Cell ID (E-CID);
- an intra-frequency Reference Signal Time Difference for OTDOA measurement;
- an inter-frequency Reference Signal Time Difference for OTDOA measurement;
- an intra-frequency user equipment receive-transmit time difference for a neighbor cell for E-CID measurement;
- an inter-frequency user equipment receive transmit measurement for E-CID measurement; or
- an inter-radio access technology (RAT) positioning measurement for E-CID measurement.

20. The network node of claim 17, wherein the at least one measurement requested to be performed by the user equipment comprises measurements to be performed on at least one of a primary carrier and a secondary carrier.

21. The network node of claim 17, wherein the another network node comprises a positioning server.

22. The network node of claim 21, wherein the positioning server comprises an Evolved Serving Mobile Location Center (E-SLMC) or a Secure User Plane Location (SUPL) Location Platform (SLP).

23. The network node of claim 17, wherein the another network node comprises a radio network node.

24. The network node of claim 23:
- wherein the radio network node comprises an evolved NodeB (eNodeB).

25. The network node of claim 17:
- wherein the receiver is configured to obtain information on the at least one measurements requested by the another network node by receiving at least one signaling message with information on at least one requested measurement from at least one third network node;
- wherein the third network node comprises one of:
  - the another network node;
  - the user equipment;
  - a core network node;
  - a Mobility Management Entity;
  - a network management node;
  - a Self Organizing Network node, or
  - a Minimizing Drive Test node.

26. The network node of claim 17, wherein the receiver and processor are configured to obtain at least some of the information on the at least one measurement requested by the another network node by sniffing at least one message transmitted between the user equipment and a positioning server to extract information on at least one positioning measurement.

27. The network node of claim 17, wherein the at least one predetermined threshold for parallel reporting criteria comprises a threshold specifying a maximum total number of parallel reporting criteria.

28. The network node of claim 17:
- wherein the at least one predetermined threshold for parallel reporting criteria specifies a maximum number of parallel reporting criteria per measurement category;
- wherein a plurality of different measurement categories are predefined to include different types of measurements.

29. The network node of claim 28, wherein the plurality of different measurement categories comprises at least one category for positioning measurements.

30. The network node of claim 29, wherein the at least one category for positioning measurements comprises at least one category for at least one of:
- an Observed Time Difference of Arrival (OTDOA);
- an Enhanced Cell ID (E-CID);
- an intra-frequency Reference Signal Time Difference for OTDOA measurement;
- an inter-frequency Reference Signal Time Difference for OTDOA measurement;
- an intra-frequency user equipment receive-transmit time difference for a neighbor cell for E-CID measurement;
- an inter-frequency user equipment receive transmit measurement for E-CID measurement; and
- an inter-radio access technology (RAT) positioning measurement for E-CID measurement.

31. The network node of claim 17, wherein the processor and the transmitter are configured to use the obtained information to delay a previously configured measurement or de-configure the previously configured measurement to give priority to one or several other measurements.

32. The network node of claim 31 wherein the processor and the transmitter are configured to:
- delay or de-configure a mobility measurement to give priority to a positioning measurement; or
- delay or de-configure a positioning measurement to give priority to the mobility measurement.

* * * * *